(12) United States Patent
Miyoshi et al.

(10) Patent No.: US 9,388,965 B2
(45) Date of Patent: Jul. 12, 2016

(54) LIGHT SOURCE DEVICE

(71) Applicant: Hitachi Maxell, Ltd., Osaka (JP)

(72) Inventors: Kohei Miyoshi, Ibaraki (JP); Masayuki Fukui, Ibaraki (JP); Kei Adachi, Ibaraki (JP); Chohei Ono, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 139 days.

(21) Appl. No.: 14/189,121

(22) Filed: Feb. 25, 2014

(65) Prior Publication Data

US 2014/0254129 A1 Sep. 11, 2014

(30) Foreign Application Priority Data

Mar. 7, 2013 (JP) ................................. 2013-045490

(51) Int. Cl.
  *G03B 21/20* (2006.01)
  *G02B 5/02* (2006.01)
  *F21V 13/08* (2006.01)
  *F21K 99/00* (2016.01)

(52) U.S. Cl.
  CPC . *F21V 13/08* (2013.01); *F21K 9/56* (2013.01); *F21K 9/58* (2013.01); *G03B 21/204* (2013.01); *G02B 5/0257* (2013.01); *G03B 21/2066* (2013.01)

(58) Field of Classification Search
  CPC .. G03B 21/204; G03B 21/20; G03B 21/2066; G02B 5/02; G02B 5/0205; G02B 5/0278; G02B 5/0284; G02B 5/0257
  USPC ....................... 353/94, 84; 359/599
  See application file for complete search history.

(56) References Cited

U.S. PATENT DOCUMENTS

| | | | | |
|---|---|---|---|---|
| 2008/0278689 A1* | 11/2008 | Read et al. | ......................... | 353/7 |
| 2010/0328632 A1 | 12/2010 | Kurosakai et al. | | |
| 2011/0310363 A1* | 12/2011 | Kita | ................................ | 353/98 |
| 2012/0133903 A1 | 5/2012 | Tanaka | | |

FOREIGN PATENT DOCUMENTS

JP     2010-13313 A     1/2011

OTHER PUBLICATIONS

Office Action, mailed Jul. 3, 2015, which issued during the prosecution of Chinese Patent Application No. 201410073224.5, which corresponds to the present application.

\* cited by examiner

*Primary Examiner* — William C Dowling
*Assistant Examiner* — Ryan Howard
(74) *Attorney, Agent, or Firm* — Baker Botts L.L.P.

(57) ABSTRACT

A light source device includes an excitation light source that generates excitation light, a phosphor wheel including a phosphor segment that generates fluorescent light by excitation of the excitation light, and a mirror that guides the excitation light from the excitation light source to the phosphor wheel and emits the fluorescent light from the phosphor wheel as illumination light. The phosphor wheel further includes an anisotropic diffusion and reflection unit that diffuses and reflects incident excitation light such that an optical path for the incident excitation light and an optical path for the diffused excitation light after incidence of the excitation light are not overlapped. The mirror includes a first region that reflects the excitation light and transmits the fluorescent light and a second region that transmits the fluorescent light and the diffused excitation light which the anisotropic diffusion and reflection unit has diffused and reflected.

12 Claims, 13 Drawing Sheets

LIGHT SOURCE DEVICE

CROSS-REFERENCE TO RELATED APPLICATIONS

This application claims the Japanese Patent Application No. 2013-045490, filed on Mar. 7, 2013, which is incorporated herein by reference in its entirety.

BACKGROUND OF THE INVENTION

1. Field of the Invention

The present invention relates to a light source device.

2. Description of the Related Art

In this technical field, there is a proposed light source device in which excitation light emitted from a solid light source is converted to visible light by a phosphor segment so that the light can be emitted efficiently. JP-2011-13313-A discloses an invention in which excitation light (blue laser light) emitted from a light source is emitted to a disc-like substrate (phosphor wheel) on which the phosphor segment is formed, and fluorescent light of a plurality of colors (red light and green light) is emitted to be used as illumination light.

SUMMARY OF THE INVENTION

According to JP-2011-13313-A, the excitation light passing through a transmissive portion of the phosphor wheel, and the fluorescent light generated at the phosphor wheel are used as the illumination light; however, both the excitation light and fluorescent light are emitted in different directions opposing to each other interposing the phosphor wheel. Therefore, there is a problem in which the number of optical components for combining the light is increased and the size of the light source device is enlarged. Further, there is another problem in which optical loss is caused by the plurality of optical components disposed in an optical system, thereby decreasing light use efficiency (illumination light intensity).

The object of the present invention is to provide a light source device in which diffused excitation light and fluorescent light from a phosphor wheel are emitted from the same side of the phosphor wheel, and both the diffused excitation light and the fluorescent light are condensed to be used as illumination light with a simple structure.

One of preferred embodiments of the present invention to solve the above-motioned problems will be described below.

The light source device includes: an excitation light source configured to generate excitation light; a phosphor wheel including a phosphor segment configured to generate fluorescent light by excitation of the excitation light from the excitation light source; and a mirror configured to guide the excitation light from the excitation light source to the phosphor wheel and emit the fluorescent light from the phosphor wheel as illumination light, wherein the phosphor wheel further includes an anisotropic diffusion and reflection unit configured to diffuse and reflect incident excitation light so that an optical path of the incident excitation light and an optical path of diffused excitation light after the incidence of the excitation light are not overlapped; and the mirror includes a first region configured to reflect the excitation light and transmit the fluorescent light, and a second region configured to transmit the fluorescent light and the diffused excitation light which the anisotropic diffusion and reflection unit has diffused and reflected.

According to an embodiment of the present invention, the diffused excitation light and the fluorescent light are emitted from the same side of the phosphor wheel, thereby achieving size reduction of the light source device without decreasing the illumination light intensity.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
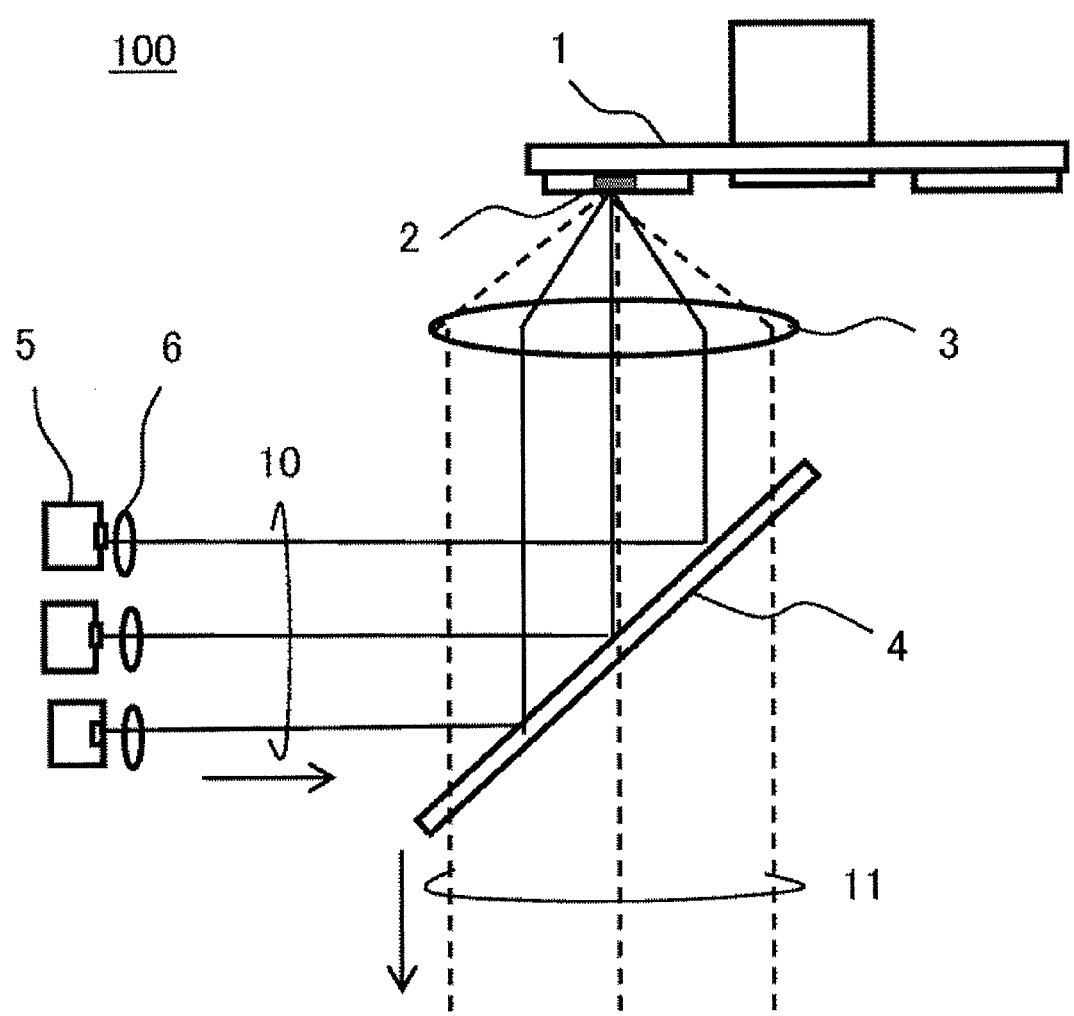
FIG. 1 is a diagram illustrating a configuration of a light source device according to a first embodiment of the present invention.

Embodiments of the present invention will be described in detail below with reference to the accompanying drawings, wherein like reference numerals refer to like parts throughout the drawings thereof.

First Embodiment

FIG. 1 is a diagram illustrating a configuration of a light source device according to a first embodiment of the present invention. A light source device 100 includes an excitation light source 5, a mirror 4, and a phosphor wheel 1 as main components. The excitation light source 5 includes one or more solid light emitting elements such as a laser light emitting element and emits a blue laser beam as excitation light, for example. Excitation light 10 (indicated by solid lines) emitted from the excitation light source 5 is made to substantially parallel by a collimate lens 6 and enters the mirror 4.

The mirror 4 includes two regions. A first region is a dichroic coated region 21 having a property to reflect a wavelength band of the excitation light (blue) and to transmit the wavelength bands of fluorescent light (red, yellow and green). A second region is a wide wavelength transmissive region 22 that transmits the wavelength bands of both the excitation light and the fluorescent light. The first region has an area smaller than the second region. Concrete examples of the mirror 4 will be described later with reference to FIGS. 2A and 2B. The excitation light 10 incident from the excitation light source 5 is reflected by the dichroic coated region 21 of the mirror 4 and condensed by a condensing lens 3, and then enters the phosphor wheel 1.

On the phosphor wheel 1 which can rotate, a phosphor segment 2 configured to emit the fluorescent light of a predetermined color by excitation of the excitation light 10 is formed. For example, to emit the fluorescent light of three colors such as red, yellow and green, a disk surface is divided into a plurality of regions in the circumferential direction to form respective phosphor segments for the respective colors of red, yellow and green. Additionally, a diffusion and reflection unit configured to diffuse and reflect the excitation light 10 is disposed on the disk surface. A concrete example of the phosphor wheel 1 will be described later with reference to FIG. 4. Upon receipt of the excitation light 10, the fluorescent light of three colors including red, yellow and green will be generated from the respective phosphor segments 2 of the phosphor wheel 1, and diffused excitation light is generated from the diffusion and reflection unit. Both fluorescent light and the diffused excitation light are made to be substantially parallel by the condensing lens 3 and enter the mirror 4.

The fluorescent light having entered the mirror 4 passes through either one of the dichroic coated region 21 and the wide wavelength transmissive region 22 inside the mirror 4. On the other hand, the diffused excitation light having entered the mirror 4 is reflected by the dichroic coated region 21 but passes through the wide wavelength transmissive region 22. As a result, all the fluorescent light and most of the diffused excitation light are emitted as illumination light 11 downward in FIG. 1.

With this configuration, both the fluorescent light and the diffused excitation light generated at the phosphor wheel 1 are emitted from the same side of the phosphor wheel 1 (downward in FIG. 1) and pass through the mirror 4 to be the illumination light. Therefore, it is not necessary to provide any additional optical system to combine both light, thereby achieving to reduce the device size.

Figure 2A:
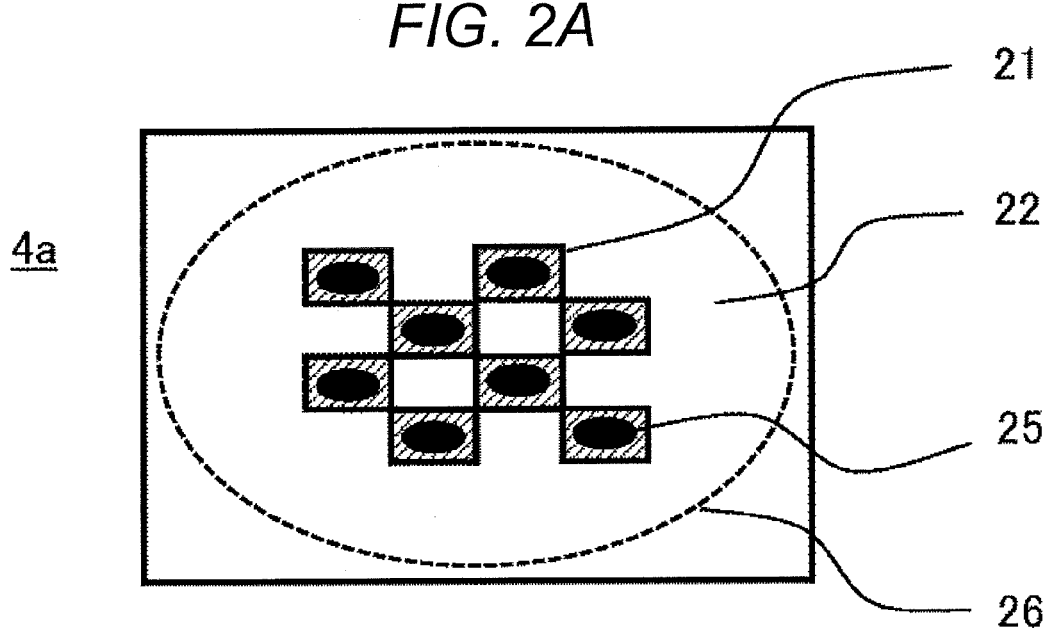
FIGS. 2A and 2B are diagrams illustrating two concrete examples of a mirror 4.
Figure 2B:
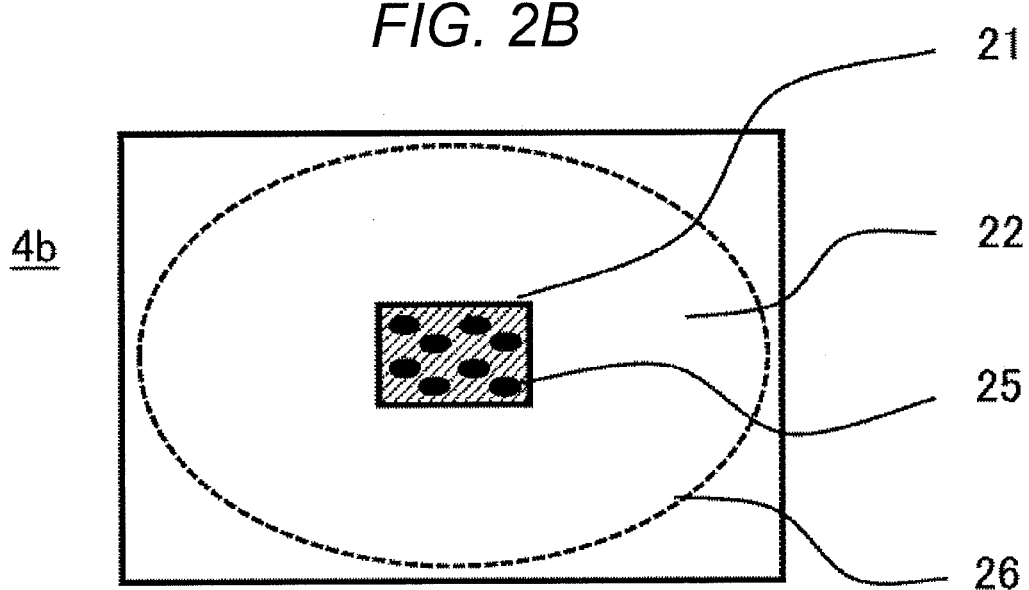

FIGS. 2A and 2B are diagrams illustrating two concrete examples of the mirror 4.

In FIG. 2A, the dichroic coated region 21 (shaded area), which is the first region and divided into parts arranged in checkerboard patterns, are disposed in the center portion of an incident surface of a mirror 4a, and the remaining portion of the mirror is formed as the wide wavelength transmissive region 22 (white area) which is the second region. The dichroic coated region 21 has the property to reflect the wavelength band of the excitation light (blue) and transmit the wavelength bands of the fluorescent light (red, yellow and green). The wide wavelength transmissive region 22 transmits the wavelength bands of both the excitation light and the fluorescent light. The number and size of divided parts and a position of the dichroic coated region 21 are determined by the number, shape and positions of incident spot 25 (black colored) of the excitation light 10 from the excitation light source 5. Therefore, the excitation light 10 from the excitation light source 5 are entirely directed to the phosphor wheel 1.

On the other hand, the fluorescent light and diffused excitation light generated at the phosphor wheel 1 are enlarged to a size of an incident spot 26 (indicated by a dotted line) and enter the incident surface of the mirror 4a. Among the light, the fluorescent light entirely passes through the incident spot 26 to be the illumination light. On the other hand, the diffused excitation light having entered the dichroic coated region 21 partly cannot pass the incident spot and causes illumination light loss; however, a large part of the diffused excitation light having entered the wide wavelength transmissive region 22 of a large area pass to be the illumination light.

In FIG. 2B, the dichroic coated region 21 (shaded area) shaped in a rectangular (or a square) is disposed in the center portion of the incident surface of the mirror 4b, and the remaining portion is formed as the wide wavelength transmissive region 22 (white area). In this case, the incident spot 25 (indicated by black color) for excitation light 10 from the excitation light source 5 is so small that all of the spots 25 can be included within the dichroic coated region 21. Compared with the case in FIG. 2A, the area of the dichroic coated region 21 may be formed smaller, thereby reducing the illumination light loss caused at the dichroic coated region 21.

The illumination light loss at the dichroic coated region 21 depends on the area of the dichroic coated region 21. According to the simulation, the illumination light loss can be reduced equivalent to that in the related art JP-2011-13313-A in the case of reducing the area of the dichroic coated region 21 to three percent or less than the area of incident spot 26.

Thus, by selectively disposing the dichroic coated region 21 within the wide wavelength transmissive region 22, the mirrors 4a and 4b according to the present embodiment can reflect and guide the excitation light 10 from the excitation light source 5 to the phosphor wheel 1, and also can transmit the diffused excitation light from the phosphor wheel 1 to emit it as the illumination light.

Figure 3:
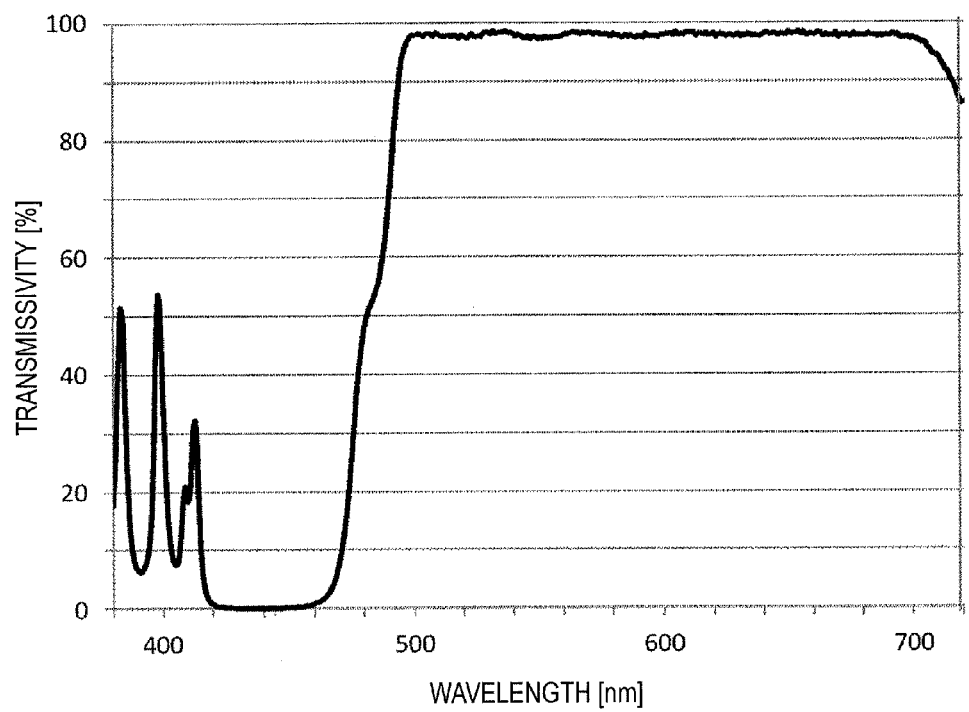
FIG. 3 is a diagram illustrating an example of spectral characteristics of the mirror 4.

FIG. 3 is a diagram illustrating an example of spectral characteristics of the mirror 4, where a horizontal axis indicates the wavelength and a vertical axis indicates the transmissivity. The dichroic coated region 21 does not transmit the wavelength band for blue (approximately 420 to 470 nm) and transmits larger wavelength band (for red, yellow and green). Such spectral characteristics can be achieved by using a dielectric multilayer film ($TiO_2$, $SiO_2$, etc.).

Figure 4:
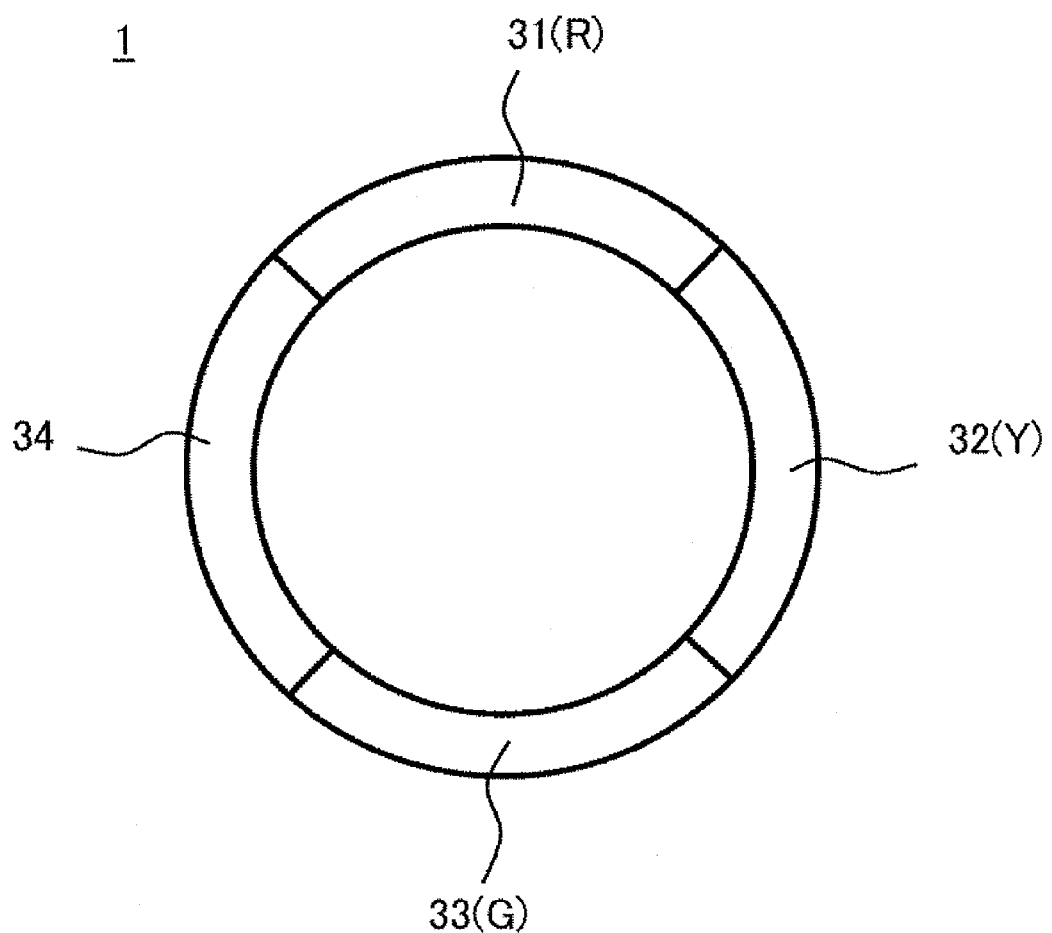
FIG. 4 is a diagram illustrating a concrete example of a phosphor wheel 1.

FIG. 4 is a diagram illustrating a concrete example of the phosphor wheel 1. The phosphor wheel 1 is divided into four segments in the circumferential direction, and a red phosphor segment 31, a yellow phosphor segment 32 and a green phosphor segment 33 are applied to the respective segments as the phosphor segments 2, for example. The remaining one segment is formed as the diffusion and reflection unit 34 where the reflection mirror is made to have a diffusing function. The respective phosphor segments 31, 32 and 33 emit the red fluorescent light, yellow fluorescent light and green fluorescent light upon receipt of the excitation light 10. The diffusing function of the diffusion and reflection unit 34 can be obtained by forming a base material of phosphor wheel 1 with silver deposition and the like so as to have mirror reflection, and further bonding a transmissive diffusing plate having high heat resistance on top of the silver deposited part, or applying diffusion material (paste or the like) to the reflection surface. In this case, the diffusing plate (diffusion material) is to be an optical path where the excitation light passes reciprocatingly twice, and therefore diffusivity is preferably determined in consideration of the situation. Otherwise, the diffusion function can be obtained by forming fine irregularities on the reflection surface itself so that the light is diffused and reflected simultaneously. By diffusing thus the excitation light reflected by the diffusion and reflection unit 34, there is an effect that speckle noise inside the laser beam is removed. Note that the effect of removing the speckle noise is further enhanced by rotation of the phosphor wheel 1.

Figure 5:
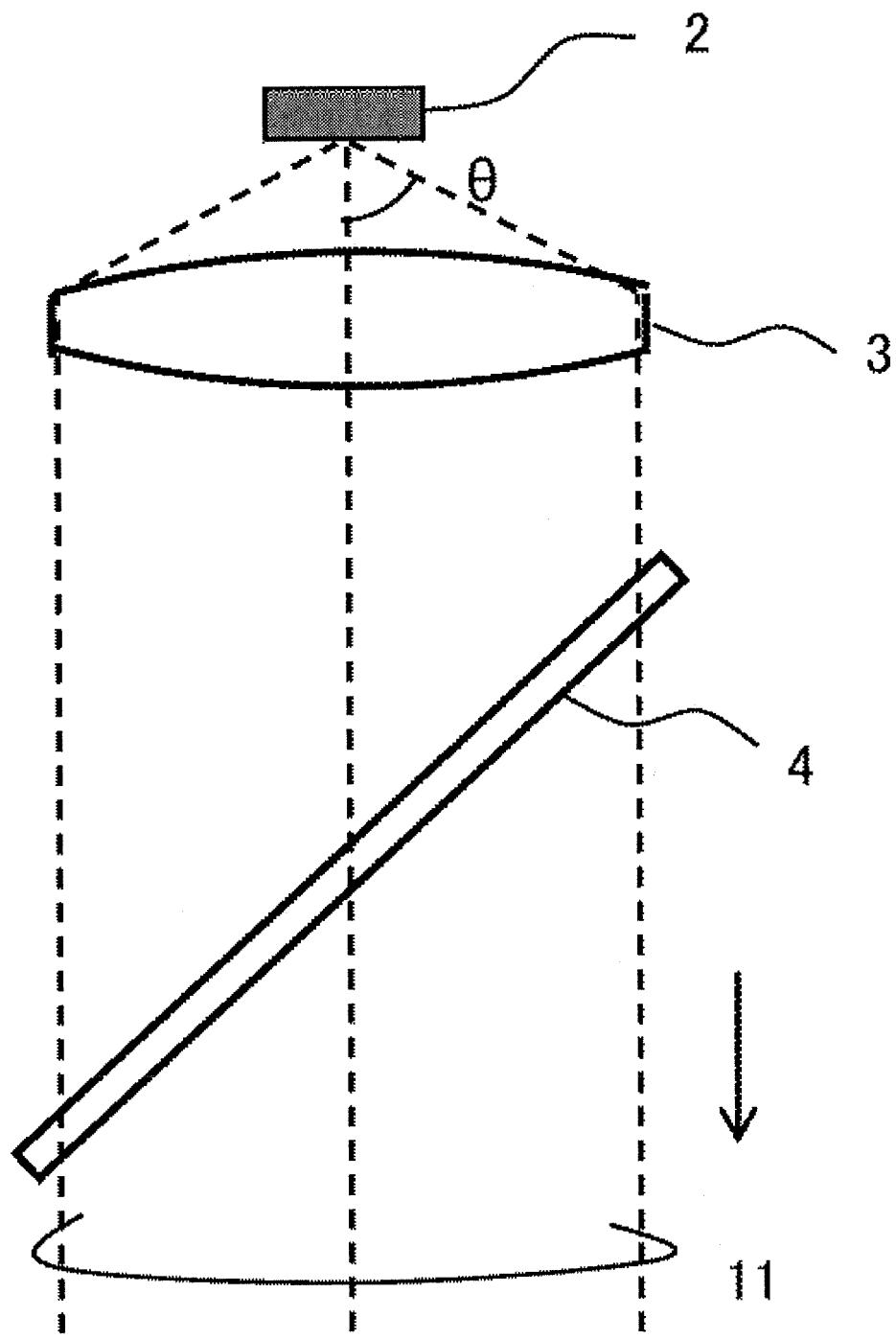
FIG. 5 is a diagram illustrating diffusivity of light emitted from the phosphor wheel 1.

FIG. 5 is a diagram illustrating diffusivity of the light emitted from the phosphor wheel 1. First, the fluorescent light from the phosphor segments 2 (31, 32 and 33) of the phosphor wheel 1 are emitted substantially uniformly in all directions, and reflected by the mirror surface formed on the back surface of the phosphor segment. As a result, the light is semispherically emitted to the side of the condensing lens 3. Among the emitted light, the light having entered an effective range of the condensing lens 3 reaches the mirror 4 and is utilized as the illumination light 11.

On the other hand, the diffused excitation light from the diffusion and reflection unit 34 of the phosphor wheel 1 is emitted semispherically to the side of the condensing lens 3, but the diffusivity (diffusion angle θ) can be adjusted by, for example, the kind of material and the way of processing of the diffusing plate. In the case where the diffusion angle θ of the diffused excitation light is set too large, the light use efficiency is decreased because the diffused excitation light leaks out to the outside of the effective range of the condensing lens 3. Conversely, in the case where the diffusion angle θ is set too small, the diffused excitation light passes through only the center portion of the effective range of the condensing lens 3. As a result, a proportion of the diffused excitation light entering the dichroic coated region 21 of the mirror 4 is increased, thereby increasing the illumination light loss. Therefore, the diffusion angle θ is preferably adjusted such that the diffused excitation light from the diffusion and reflection unit 34 be diffused in a range substantially same as the effective range of the condensing lens 3.

Incidentally, combination of the color of excitation light with the color of the phosphor segment, the number of the phosphor segments and the phosphor segment shape (angle) are not limited to the above-described embodiment, and modifications may be suitably made in accordance with requested specification of the illumination light. For example, while the blue laser beam is generated from the excitation light source, the red fluorescent light and green fluorescent light may be generated from the phosphor wheel, removing the yellow phosphor segment, or phosphor segments of other colors such as cyan and magenta may be added, too.

Second Embodiment

In a second embodiment, a description will be given for a case in which a positional relation between a phosphor wheel 1 and an excitation light source 5 is changed.

Figure 6:
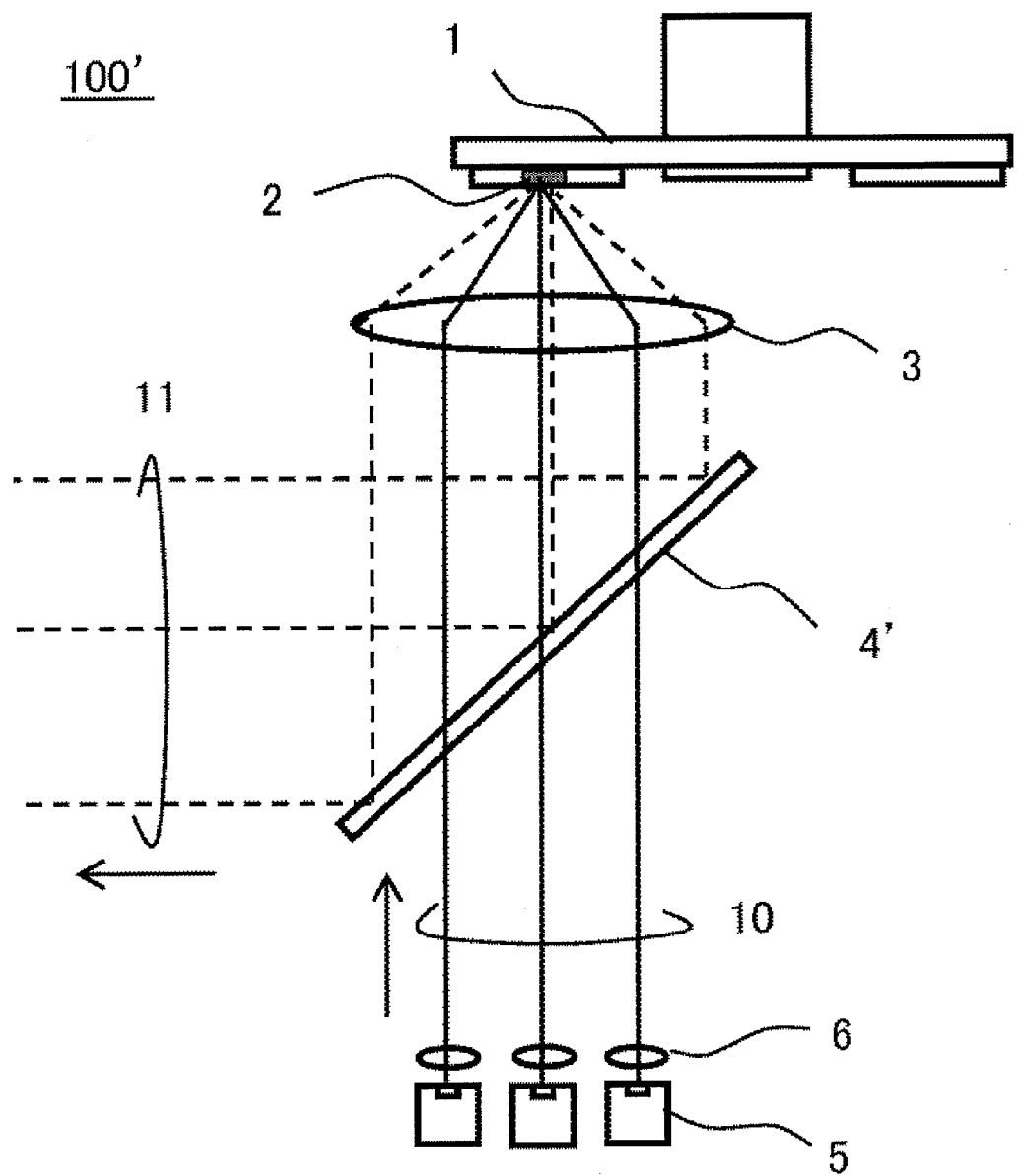
FIG. 6 is a diagram illustrating a configuration of the light source device according to a second embodiment of the present invention.

FIG. 6 is a diagram illustrating a configuration of a light source device according to the second embodiment of the present invention. The basic configuration of a light source device 100' is same as that of a first embodiment (FIG. 1); however different in following points: an excitation light source 5 is positioned at a bottom part of FIG. 6; a mirror 4' is configured to have the inverse property in the aspects of transmission and reflection of a mirror 4; and illumination light is emitted leftward in the FIG. 6. In other words, although the mirror 4' has a configuration illustrated in FIG. 2, a dichroic coated region 21 has the property to transmit a wavelength band of an excitation light (blue) and reflect the wavelength band of fluorescent light (red, yellow and green), and a wide wavelength reflective region 22 has the property to reflect the wavelength bands of both the excitation light and the fluorescent light. Additionally, the dichroic coated region 21 has inverse spectral characteristics with respect to vertical axis of FIG. 3. In other words, the vertical axis in this embodiment indicates reflectivity instead of the transmissivity.

An excitation light 10 incident from the excitation light source 5 passes through the dichroic coated region 21 of the mirror 4' and is condensed by a condensing lens 3, and then enters the phosphor wheel 1. Upon receipt of the excitation light 10, the fluorescent light of three colors including red, yellow and green is generated from respective phosphor segments 2 of the phosphor wheel 1, and a diffused excitation light is diffused and generated from a diffusion and reflection unit. These fluorescent light and diffused excitation light are made to be substantially parallel by the condensing lens 3 and enter the mirror 4'.

The fluorescent light having entered the mirror 4' is reflected by both of the dichroic coated region 21 and wide wavelength reflective region 22 inside the mirror 4'. On the other hand, the diffused excitation light having entered the mirror 4' passes through the dichroic coated region 21 but is reflected by the wide wavelength reflective region 22. As a result, the entire fluorescent light and most of the diffused excitation light are emitted leftward in FIG. 6 as illumination light 11.

With this configuration, both the fluorescent light and the diffused excitation light generated in the phosphor wheel 1 are emitted to the same side (leftward in FIG. 6) from the phosphor wheel 1, and most of them is reflected on the mirror 4' to be the illumination light. Therefore, it is not necessary to provide any additional optical system to combine both the fluorescent light and the diffused excitation light, thereby achieving reduction of the device size.

Now, adjustment of an optical axis according to the first and second embodiments will be described. In the light source device according to the above embodiments, it is necessary to reflect the excitation light emitted from the excitation light source 5 by the specific region (dichroic coated region 21) of the mirror 4, and condense the reflected light to the specific position (phosphor segment 2) of the phosphor wheel 1. Therefore, a mechanism for adjusting deviations of an emitting position and an emitting direction caused by the excitation light source 5 is provided.

In the case where the excitation light source 5 and a collimate lens 6 are integrally configured, the excitation light source 5 and the collimate lens 6 are integrally moved in a direction vertical to an optical axis so as to adjust the deviations of the emitting position and the emitting direction of the excitation light. Further, in the case where the excitation light source 5 and the collimate lens 6 are separately configured, only the collimate lens 6 is moved in a direction vertical to the optical axis to adjust the deviations of the emitting position and the emitting direction of the excitation light. With this adjustment mechanism, the excitation light emitted from the excitation light source 5 can be stably condensed on the specific position of the phosphor wheel 1 via the mirror 4, thereby eliminating decrease of illumination light intensity.

Third Embodiment

A light source device according to a third embodiment is configured such that a diffused excitation light reflected by a phosphor wheel 1 may enter, avoiding a dichroic coated region of a mirror 4. With this configuration, illumination light loss caused by the dichroic coated region can be reduced. This configuration is effective in the case where the dichroic coated region cannot be formed small.

Ideally, the diffused excitation light perfectly avoids the dichroic coated region 21 and preferably all enters a wide wavelength transmissive region 22. But practically, a small amount of the diffused excitation light inevitably enters the dichroic coated region 21. Therefore, this configuration is intended to prevent the diffused excitation light from entering the dichroic coated region as much as possible.

Figure 7:
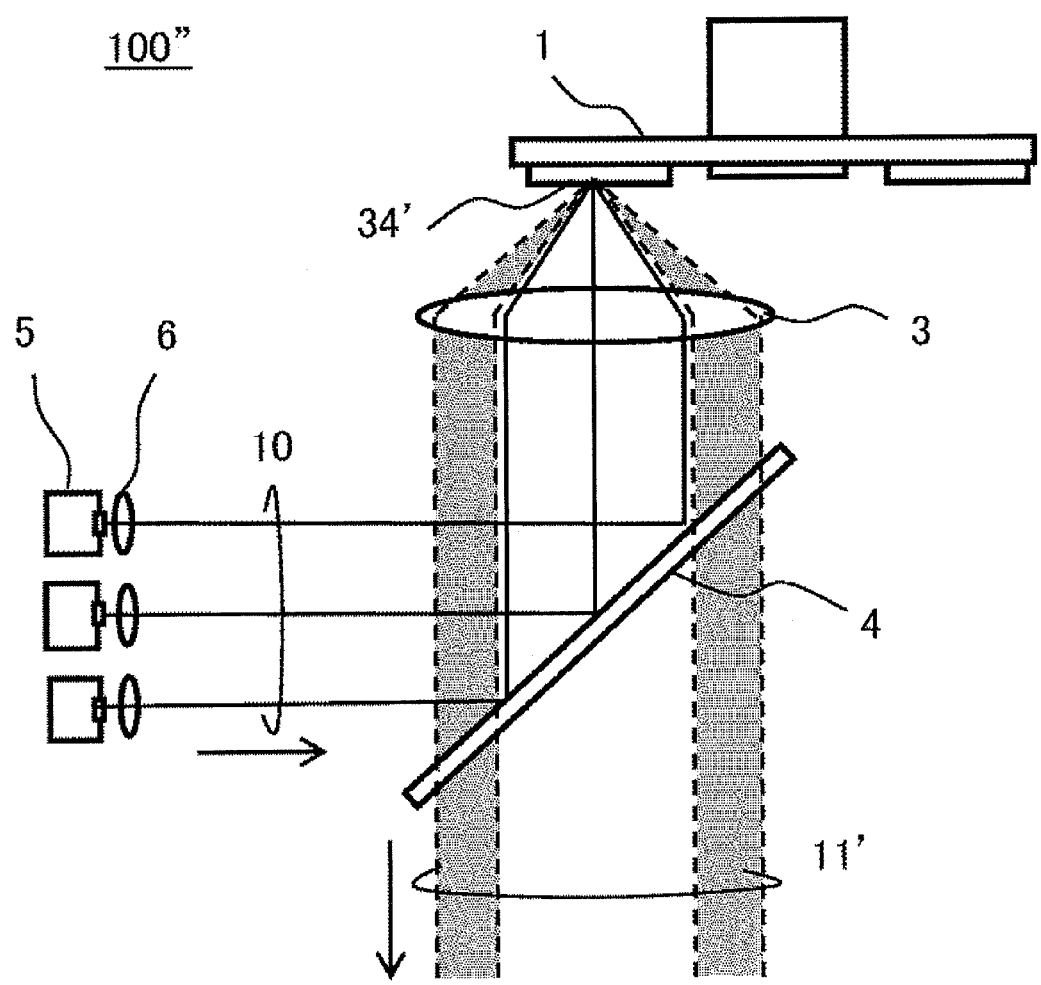
FIG. 7 is a diagram illustrating a configuration of the light source device according to a third embodiment of the present invention.

FIG. 7 is a diagram illustrating a configuration of the light source device according to the third embodiment of the present invention. Here, a description will be given for the case in which a basic configuration according to a first embodiment (FIG. 1) is applied. In a light source device 100", an anisotropic diffusion and reflection unit 34' having anisotropy in a diffusing direction is used, as described later, such that the diffused excitation light reflected by the phosphor wheel 1 is directed to a specific direction. As a result, excitation light 10 (indicated by solid lines) emitted from the excitation light source 5 is reflected by an inner region (dichroic coated region 21) of the mirror 4 and directed to the phosphor wheel 1, but diffused excitation light 11' (indicated by dotted lines) reflected by the anisotropic diffusion and reflection unit 34' of the phosphor wheel 1 enters an outer region of the mirror 4, avoiding the inner region. In other words, the anisotropic diffusion and reflection unit 34' reflects the diffused excitation light 11' such that an optical path of the incident excitation light 10 and an optical path of the diffused excitation light 11' are not overlapped. A wide wavelength transmissive region 22 is formed on the outer region of the mirror 4, and therefore the diffused excitation light 11' passes through the outer region to become the illumination light.

FIG. 7 is the case in which the excitation light 10 is reflected by the inner region of the mirror 4, and the diffused excitation light 11' enters the outer region of the mirror 4. However, another configuration is possible here, in which the inner region and outer region of the mirror 4 are inverse and the excitation light 10 is reflected by the outer region of the mirror 4 and the diffused excitation light 11' enter the inner region of the mirror 4.

Figure 8A:
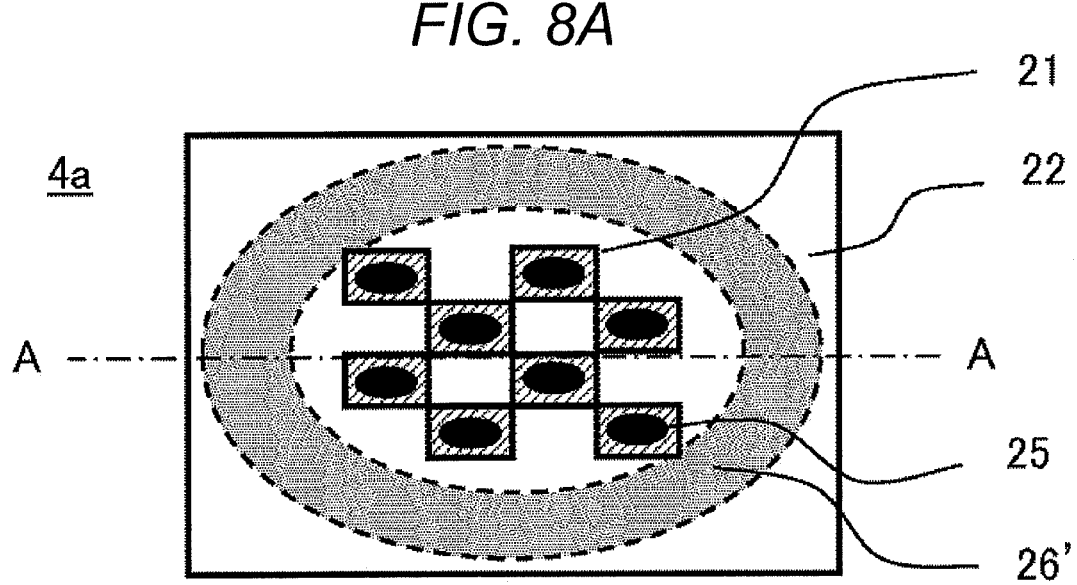
FIGS. 8A and 8B are diagrams illustrating incident ranges of diffused excitation light on the mirror.
Figure 8B:
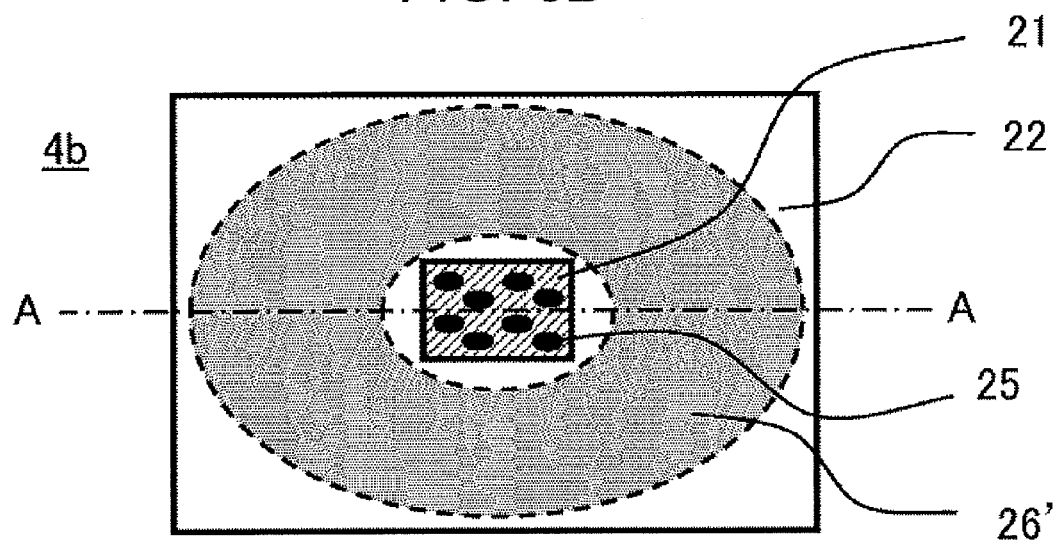

FIGS. 8A and 8B are diagrams illustrating incident ranges of diffused excitation light on the mirror. The configurations of the mirror 4 correspond to the cases 4a and 4b in FIG. 2. The dichroic coated region 21 that reflects the excitation light 10 is determined by an incident position and a luminous flux diameter of the excitation light 10. The diffused excitation light 11' reflected by the anisotropic diffusion and reflection unit 34' of the phosphor wheel 1 enter a doughnut shaped incident range 26' on the outer side of the wide wavelength transmissive region 22 so as to avoid the dichroic coated region 21. Since the diffused excitation light 11' hardly enters the dichroic coated region 21, the illumination light loss caused by reflection of the mirror 4 can be reduced. Thus, even in the case where the dichroic coated region 21 cannot be formed small, the use efficiency as the illumination light may be improved.

Note that the more the diffused excitation light incident from the phosphor wheel 1 and the fluorescent light are overlapped, the less color unevenness occurs as the illumination light for video display. Accordingly, an inner periphery of the incident range 26' of the diffused excitation light 11' is preferably located as close as possible to an outer periphery of the dichroic coated region 21.

Figure 9A:
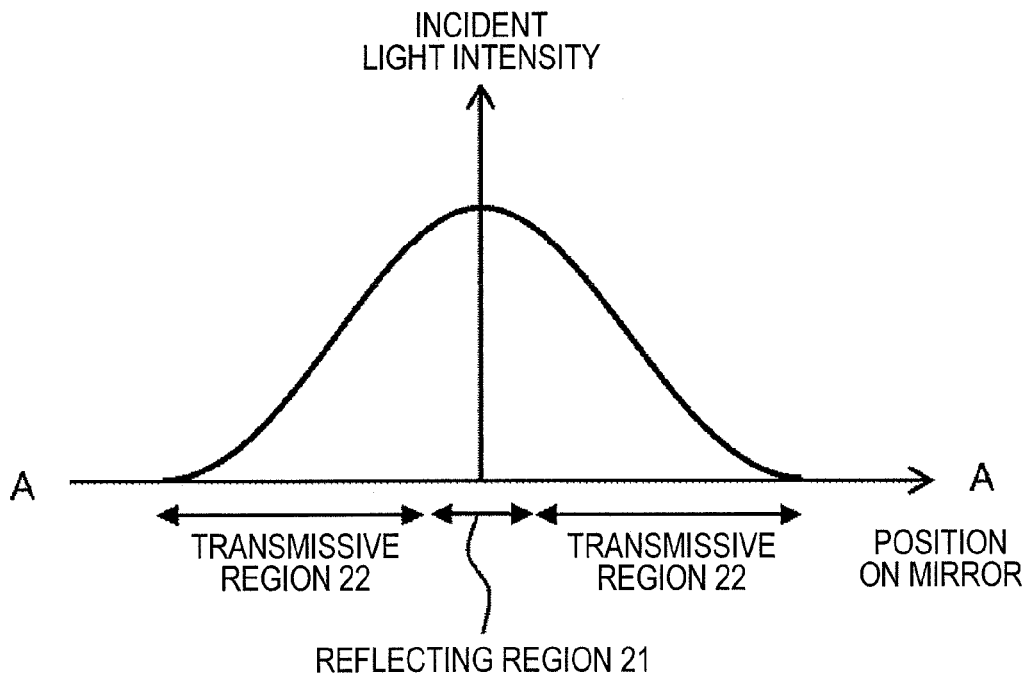
FIGS. 9A and 9B are diagrams illustrating incident intensity distribution of the diffused excitation light on the mirror.
Figure 9B:
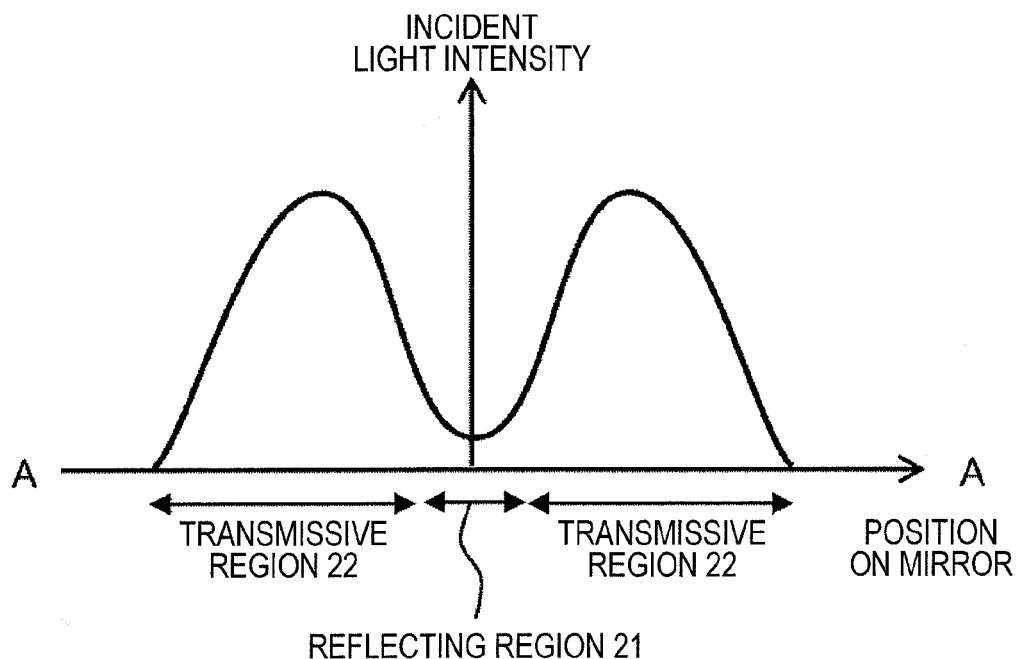

FIGS. 9A and 9B are diagrams illustrating incident intensity distribution of the diffused excitation light on the mirror. FIG. 9A is a case in which a commonly used diffusing plate (isotropy) is adopted as the diffusion and reflection unit for the purpose of comparison, and FIG. 9B is a case in which the diffusion and reflection unit is provided with anisotropy same the present embodiment. The incident intensity distribution illustrated in both FIGS. 9A and 9B are the distribution data at a cross section taken along A-A line in FIG. 8. In the case of isotropic diffusion in FIG. 9A, the closer to the center of the mirror the incident position is, the higher the incident intensity of the diffused excitation light becomes. Accordingly, the diffused excitation light having the higher incident intensity is reflected by the reflecting region (dichroic coated region) 21, thereby causing the illumination light loss. In contrast, in the case of anisotropic diffusion illustrated in FIG. 9B, the incident intensity is highest in the transmissive region (wide wavelength transmissive region) 22 on the outer side of the mirror while the incident intensity is attenuated in the center portion of the mirror. This incident intensity distribution reduces the illumination light loss in the center portion of the mirror.

Note that the present embodiment is intended to improve the light use efficiency by preventing the diffused excitation light from entering the dichroic coated region 21 as much as possible. That means, the present embodiment is not intended to negate the incident intensity becoming highest in the reflection region (dichroic coated region) 21. For example, according to the present embodiment, a light amount may have a small peak value in the center portion of the mirror, and may have a large value in the peripheral portion of the mirror, comparing with the general case in FIG. 9A. Further, the incident light intensity does not have to take the same peak value at both right and left sides of the transmissive region interposing the dichroic coated region 21. Also, the diffused excitation light may enter only the left transmissive region or the right transmissive region. In the following, a description will be given for a case in which the anisotropic diffusion and reflection unit 34' according to the present embodiment is implemented using a diffraction grating.

Figure 10:
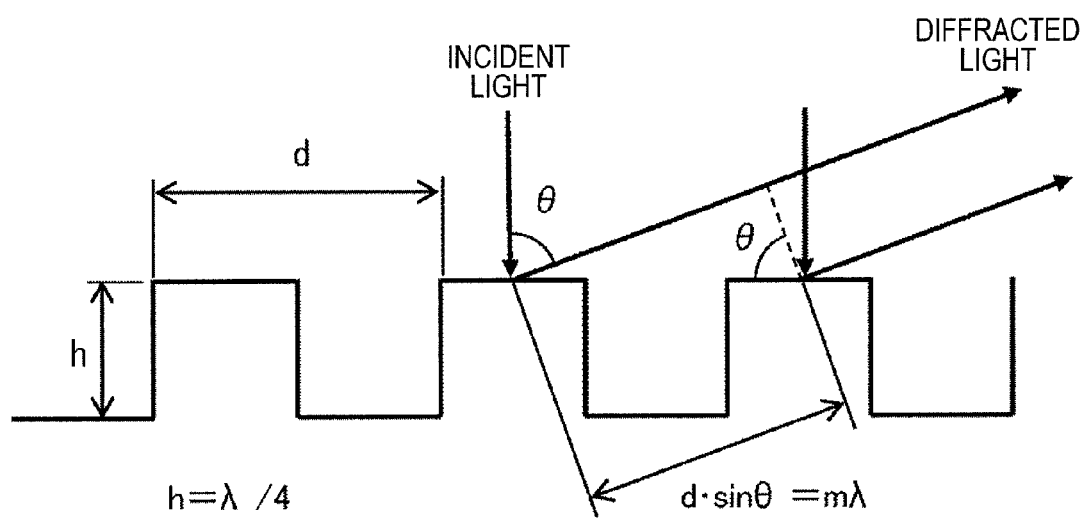
FIG. 10 is a diagram for describing emitting directions of diffracted light, using a diffraction grating.

FIG. 10 is a diagram for describing an emitting direction of diffracted light, using the diffraction grating. This is the case where the diffraction grating having a cross section formed in square waves is used as the reflection surface, and a depth of the diffraction grating is h, and a pitch thereof is d. Light having a wavelength $\lambda$ and entering vertically ($\theta=0$) is reflected as $m^{th}$ diffracted light, and an emitting angle $\theta$ thereof is expressed as follows.

$$\sin\theta = m\lambda/d \ (m=0, \pm1, \pm2, \ldots)$$

In the case where the depth h of the diffraction grating is equal to $\lambda/4$, $0^{th}$ vertical emitting light ($m=0$, $\theta=0$) is eliminated. The reason is that there is a phase difference $\pi$ between the reflected light at a top of the square wave and that at a bottom of the square wave. More specifically, an optical path difference is to be 2 h=$\lambda/2$, thereby causing the reflected light at a top of the square wave and that at a bottom of the square wave to cancel each other. As a result, a basic $\pm1^{th}$ diffracted light is emitted in a direction $\sin\theta=\pm\lambda/d$. Therefore, the reflected light can be emitted in a desired direction by suitably setting the pitch d of the diffraction grating. The diffracted light may include high order components ($m=\pm2, \pm3, \ldots$), but the high order components may be reduced, for example, by adjusting a duty ratio (ratio of the wave top to the wave bottom) of the square wave of the diffraction grating.

In order that the anisotropic diffusion and reflection unit 34' has a diffusing function, some processes may be applied. For example, fine irregularities are formed on the surface, a diffusion material (diffusion plate) is bonded to the surface, or a pasty diffusion material is applied to the surface.

Figure 11A:
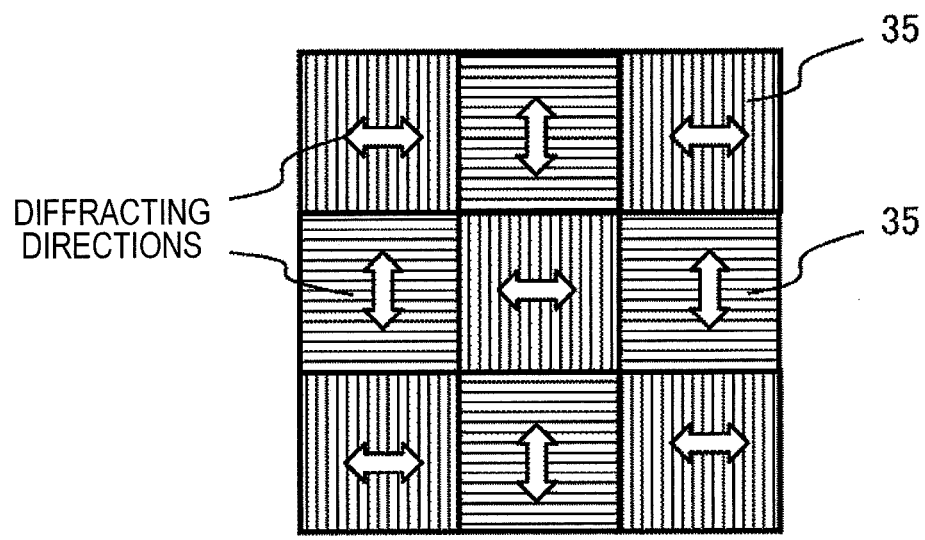
FIGS. 11A and 11B are diagrams illustrating examples in which an anisotropic diffusion and reflection unit is configured by use of the diffraction grating.
Figure 11B:
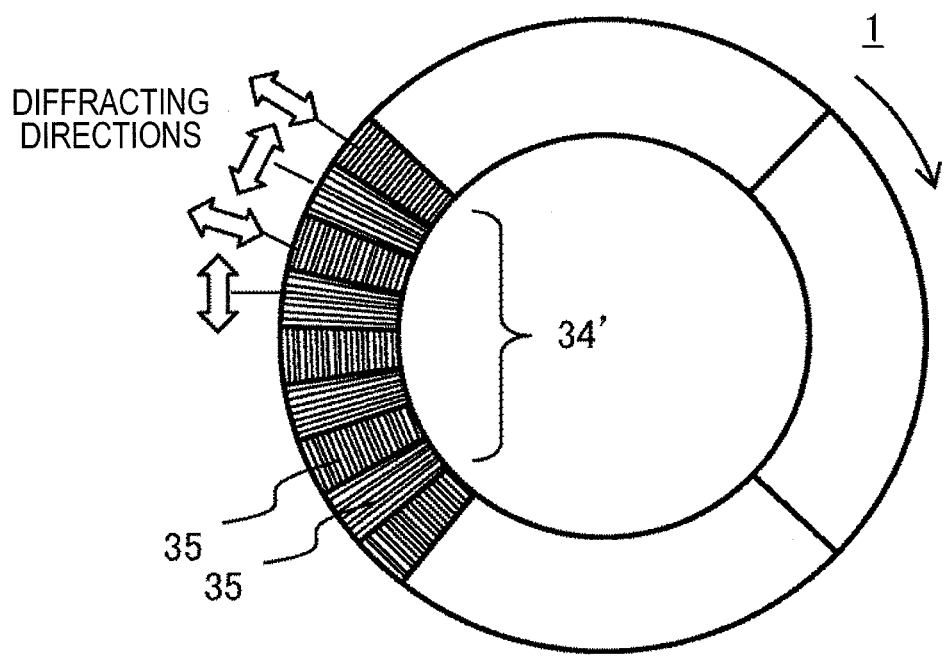

FIGS. 11A and 11B are diagrams illustrating examples in which the anisotropic diffusion and reflection unit 34' is configured using the diffraction grating in FIG. 10.

In FIG. 11A, a plurality of diffraction grating blocks 35 are arranged in a two dimensional manner and configured such that diffracting directions (indicated by arrows) of the diffraction gratings are alternately switched among the adjacent diffraction grating blocks. A spot where the excitation light enters is formed sufficiently larger than one block size, thereby achieving to obtain the diffracted light in multiple directions at the same time. According to this example, the diffracted light may be emitted in four directions: upward, downward, rightward and leftward, and therefore it is possible to obtain the diffusion and reflection unit that has the anisotropy of two-dimensional directions.

In FIG. 11B, the plurality of the diffraction grating blocks 35 are arranged in the circumferential direction of the phosphor wheel 1, in which the diffracting directions (indicated by arrows) are alternately switched between the adjacent diffraction grating blocks. The spot where the excitation light enters is formed in a size extending over the plurality of the diffraction grating blocks, but may also be formed in a size contained within the one diffraction grating block. The position of the incident spot of the excitation light is shifted when the phosphor wheel 1 rotates, thereby temporally changing the direction of the diffracted light. According to this example, the diffracted light emits in two directions: a circumferential direction and a radial direction. Accordingly, the emitting direction of the diffracted light alternately switches between the two directions temporally, and the anisotropy of the two dimensional directions can be equivalently achieved.

The anisotropic diffusion and reflection unit 34' is implemented by using the diffraction grating in the above description, but the embodiment is not limited thereto and any equivalent having the function to diffuse and reflect incident light in a specific direction may be utilized.

Also, while the basic configuration according to the first embodiment (FIG. 1) is applied in the above description, the configuration according to the second embodiment (FIG. 6) having the inverted positional relation between the phosphor wheel 1 and the excitation light source 5 may be applied, too. In this case, the mirror 4' has the inverse property of the mirror 4 in the aspect of transmission and reflection.

As described above, according to the third embodiment, the anisotropic diffusion and reflection unit 34' is disposed on the phosphor wheel 1 and configured such that the reflected diffused excitation light enters, avoiding the dichroic coated region of the mirror 4. Therefore, the illumination light loss can be reduced at the dichroic coated region.

Fourth Embodiment

In a fourth embodiment, a description will be given for an example in which a light source device according to above described embodiments is applied to a projection type video display device.

Figure 12:
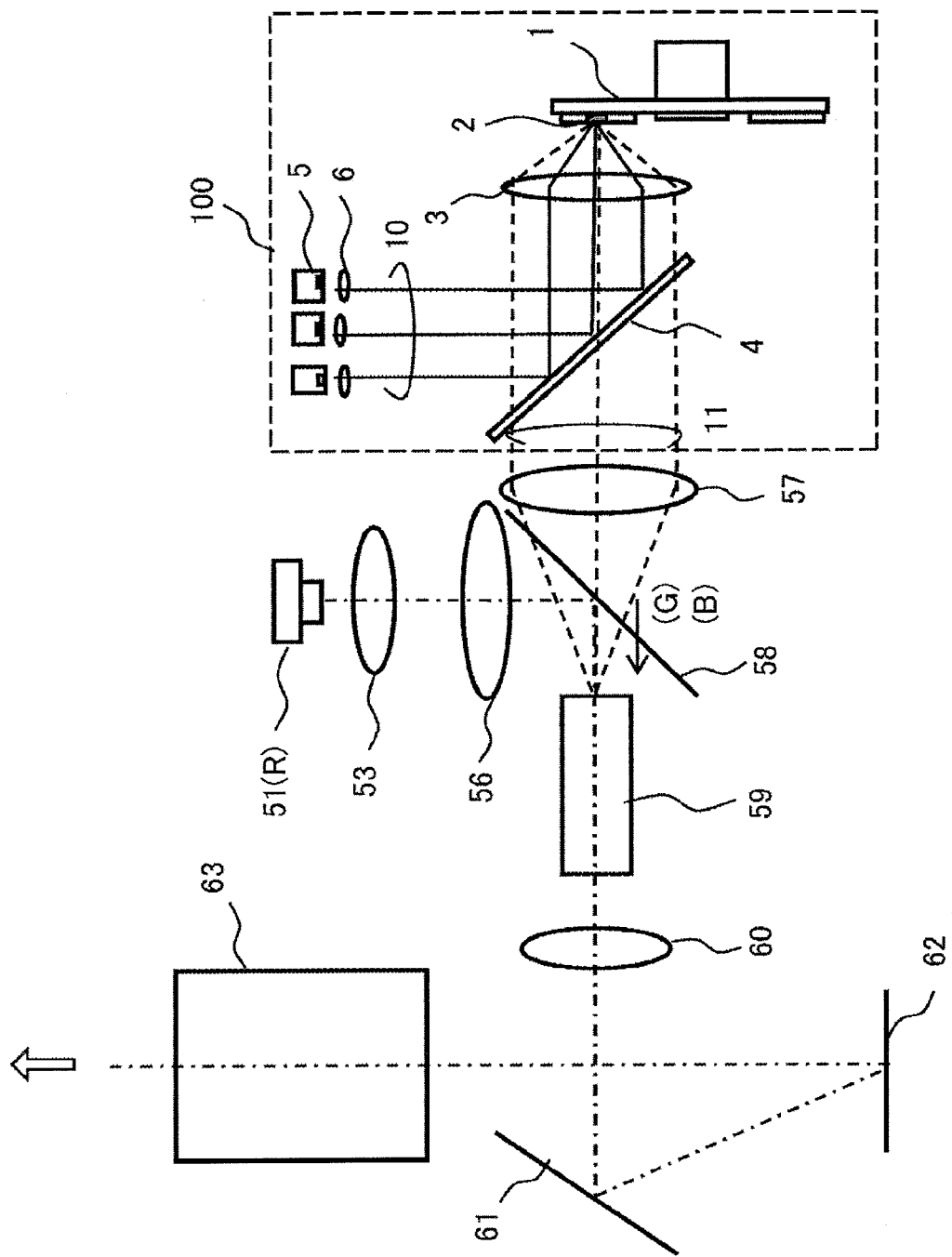
FIG. 12 is a diagram illustrating a configuration of an optical system of a projection type video display device according to a fourth embodiment of the present invention.

FIG. 12 is a diagram illustrating a configuration of an optical system of the projection type video display device according to the fourth embodiment of the present invention. Here, a description for a light source device 100 will be omitted because the light source device 100 has the same configuration as that of a first embodiment (FIG. 1).

Illumination light 11 (fluorescent light and diffused excitation light) having passed through a mirror 4 of the light source device 100 is condensed by a condensing lens 57 and enters a dichroic mirror 58. The dichroic mirror 58 has a property to transmit a green light (hereinafter as a light G) and a blue light (hereinafter as a light B) and reflect a red light (hereinafter as a light R). Therefore, the light G and light B pass through the dichroic mirror 58 and enter a multiple reflection element 59. According to the present embodiment, a red light source 51 is provided to compensate for a flux amount of the light R. The light R emitted from the red light source 51 is made substantially parallel by a collimate lens 53, condensed by a condensing lens 56, reflected by the dichroic mirror 58, and then enters the multiple reflection element 59.

The light R, light G and light B having entered the multiple reflection element 59 are reflected by the multiple reflection element 59 a plural of times to be the light having uniform illuminance distribution. The light R, light G and light B emitted from an emitting open surface of the multiple reflection element 59 pass through a condensing lens 60, and are reflected by a reflection mirror 61, and then emitted to a video display device 62, having the uniform illuminance distribution.

A digital mirror device (DMD developed by Texas Instruments) is applied as the video display device 62, for example, and the light R, light G and light B are emitted to this video display device by time sharing. An excitation light source 5 and the red light source 51 are solid light emitting elements having high response speed and are controllable by time sharing. Therefore, each color light is individually modulated by the video display device 62 by time sharing. The respective color light reflected by the video display device 62 become video light and enter a projection lens 63, to be projected on a screen not illustrated.

Here, the red light source 51 is used in addition to the light source device 100 so as to secure brightness of a specific color, but the brightness of a specific color can also be secured only by the light source device 100 without using the red light source 51. In such a case, the dichroic mirror 58 is removed and each color light emitted from the phosphor wheel 1 is used, and the video display device 62 is actuated in a synchronizing manner. Also, needless to mention, a light source device 100' according to a second embodiment (FIG. 6) or a light source device 100" according to a third embodiment (FIG. 7) may be used instead of the light source device 100.

The projection type video display device according to the present embodiment contributes to size reduction and improved performance of the projection type video display device because the downsized light source device having minimized illumination light loss is used.

Fifth Embodiment

A fifth embodiment is another example of a projection type video display device in which a liquid crystal panel corresponding to each of three colors (R, G and B) is used as a video display device.

Figure 13:
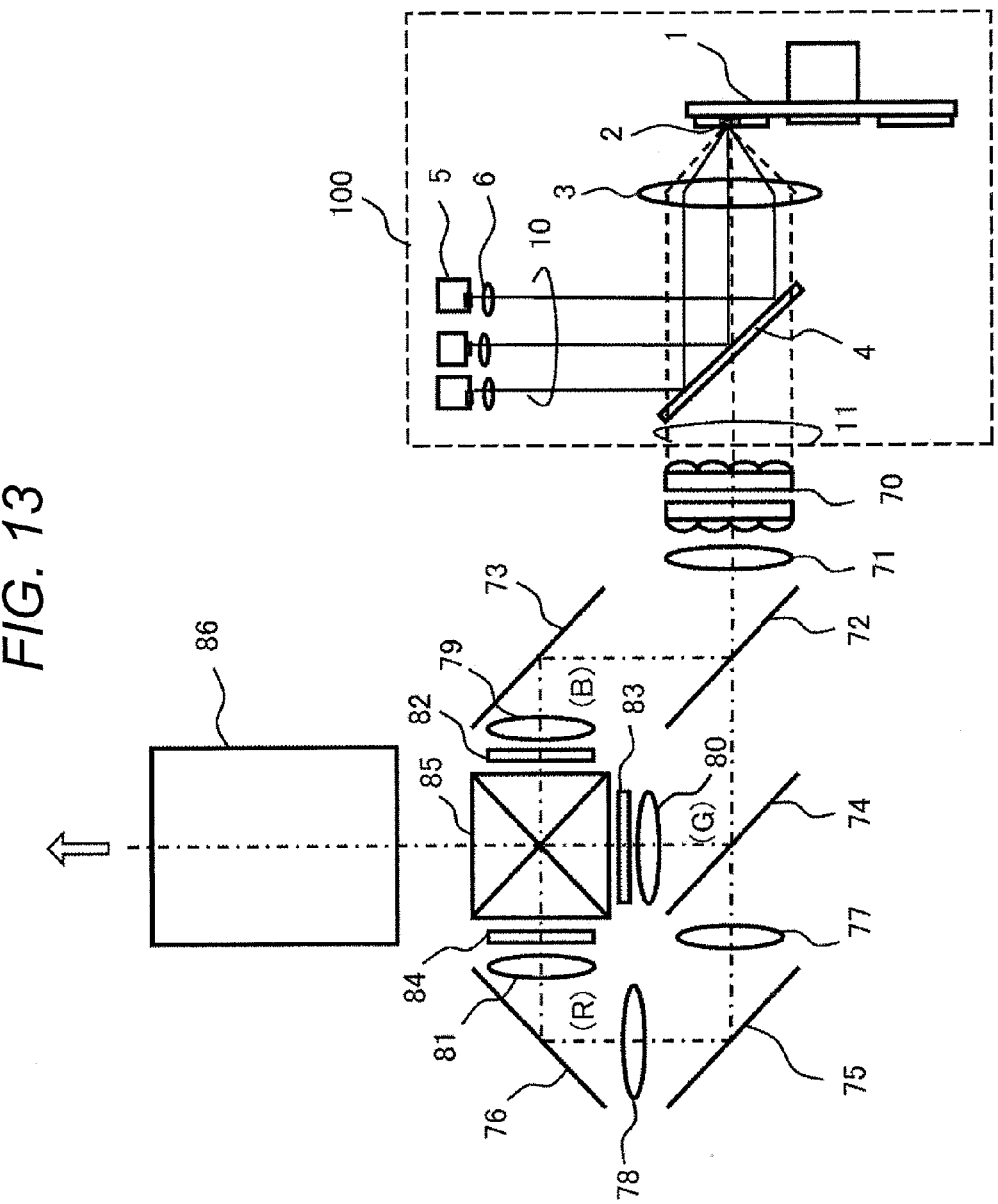
FIG. 13 is a diagram illustrating a configuration of the optical system of the projection type video display device according to a fifth embodiment of the present invention.

FIG. 13 is a diagram illustrating a configuration of the optical system of the projection type video display device according to the fifth embodiment of the present invention. Here, a description for a light source device 100 will be omitted because the light source device 100 has the same configuration as that in a first embodiment (FIG. 1). Illumination light 11 (fluorescent light and diffused excitation light) having passed through a mirror 4 of the light source device 100 is made to be uniform illumination light by a fly-eyes lens 70, and passes through a lens 71, and then proceeds to a color separation optical system.

The color separation optical system separates the illumination light emitted from the light source device 100 into light R, light G and light B, and guides each color light to a corresponding liquid crystal panel. The light B is reflected by a dichroic mirror 72 and enters a liquid crystal panel 82 for the light B via a reflection mirror 73 and a field lens 79. The light G and the light R are separated by a dichroic mirror 74 after passing through the dichroic mirror 72. The light G is reflected by the dichroic mirror 74 and passes through a field lens 80, and then enters a liquid crystal panel 83 for the light G. The light R passes through the dichroic mirror 74, and enters a liquid crystal panel 84 for the light R via relay lenses 77 and 78, reflection mirrors 75 and 76, and a field lens 81.

The respective liquid crystal panel 82, 83 and 84 respectively modulate the incident color light in accordance with respective video signals to form optical images for the respective color light. The optical image of each color light enters a color combining prism 85. The color combining prism 85 is configured of a dichroic film for reflecting the light B and a dichroic film for reflecting the light R, which are formed in an approximate X shape. The light B and light R having entered from the liquid crystal panel 82 and 84 are reflected by the dichroic film for the light B and the dichroic film for the light R respectively. The light G having entered from the liquid crystal panel 83 passes through the respective dichroic films. As a result, the optical images of the respective color light are combined and emitted as color video light. The combined color light emitted from the color combining prism 85 enters a projection lens 86 to be projected on a screen not illustrated.

The projection type video display device according to the present embodiment also contributes to size reduction and improved performance of the projection type video display device because the downsized light source device having minimized illumination light loss is used.

What is claimed is:

1. A light source device, comprising:
an excitation light source configured to generate excitation light;
a phosphor wheel including a phosphor segment configured to generate fluorescent light by excitation of the excitation light from the excitation light source; and
a mirror configured to guide the excitation light from the excitation light source to the phosphor wheel and emit the fluorescent light from the phosphor wheel as illumination light,
wherein the phosphor wheel further includes an anisotropic diffusion and reflection unit configured to diffuse and reflect incident excitation light so that an optical path of the incident excitation light and an optical path of diffused excitation light after the incidence of the excitation light are not overlapped; and
the mirror includes a first region configured to reflect the excitation light and transmit the fluorescent light, and a second region configured to transmit the fluorescent light and the diffused excitation light which the anisotropic diffusion and reflection unit has diffused and reflected, the first region comprising a plurality of parts arranged in a checkerboard pattern disposed at the center of the mirror.

2. The light source device according to claim 1,
wherein the anisotropic diffusion and reflection unit is formed using a reflection surface of a diffraction grating having a predetermined depth and a predetermined pitch.

3. The light source device according to claim 2,
wherein: the anisotropic diffusion and reflection unit is formed by bonding a diffusing plate on the reflection surface of the diffraction grating, or applying a diffusion material to the reflection surface, or providing fine irregularities on the reflection surface itself.

4. A light source device, comprising:
an excitation light source configured to generate excitation light;
a phosphor wheel including a phosphor segment configured to generate fluorescent light by excitation of the excitation light from the excitation light source; and
a mirror configured to guide the excitation light from the excitation light source to the phosphor wheel and emit the fluorescent light from the phosphor wheel as illumination light,
wherein the phosphor wheel further includes an anisotropic diffusion and reflection unit configured to diffuse and reflect incident excitation light so that an optical path of the incident excitation light and an optical path of diffused excitation light after the incidence of the excitation light are not overlapped; and
the mirror includes a first region configured to transmit the excitation light and reflect the fluorescent light, and a second region configured to reflect the fluorescent light and the diffused excitation light which the anisotropic diffusion and reflection unit has diffused and reflected, the first region comprising a plurality of parts arranged in a checkerboard pattern disposed at the center of the mirror.

5. The light source device according to claim 4,
wherein the anisotropic diffusion and reflection unit is formed using a reflection surface of a diffraction grating having a predetermined depth and a predetermined pitch.

6. The light source device according to claim 5,
wherein: the anisotropic diffusion and reflection unit is formed by bonding a diffusing plate on the reflection surface of the diffraction grating, or applying a diffusion material to the reflection surface, or providing fine irregularities on the reflection surface itself.

7. A light source device, comprising:
an excitation light source configured to generate excitation light;
a phosphor wheel including a phosphor segment configured to generate fluorescent light by excitation of the excitation light from the excitation light source; and
a mirror configured to guide the excitation light from the excitation light source to the phosphor wheel and emit the fluorescent light from the phosphor wheel as illumination light,
wherein the phosphor wheel further includes an anisotropic diffusion and reflection unit configured to diffuse and reflect incident excitation light to a specific direction;
the mirror includes a first region configured to reflect the excitation light and transmit the fluorescent light, and a second region configured to transmit the fluorescent light and the diffused excitation light which the anisotropic diffusion and reflection unit has diffused and reflected, the first region comprising parts arranged in a checkerboard pattern disposed at the center of the mirror; and
the diffused excitation light from the anisotropic diffusion and reflection unit is incident so as to avoid the first region.

8. The light source device according to claim 7,
wherein the anisotropic diffusion and reflection unit is formed using a reflection surface of a diffraction grating having a predetermined depth and a predetermined pitch.

9. The light source device according to claim 8,
wherein the anisotropic diffusion and reflection unit is formed by bonding a diffusing plate on the reflection surface of the diffraction grating, or applying a diffusion material to the reflection surface, or providing fine irregularities on the reflection surface itself.

10. A light source device, comprising:
an excitation light source configured to generate excitation light;
a phosphor wheel including a phosphor segment configured to generate fluorescent light by excitation of the excitation light from the excitation light source; and
a mirror configured to guide the excitation light from the excitation light source to the phosphor wheel and emit the fluorescent light from the phosphor wheel as illumination light,
wherein the phosphor wheel further includes an anisotropic diffusion and reflection unit configured to diffuse and reflect incident excitation light to a specific direction;

the mirror includes a first region configured to transmit the excitation light and reflect the fluorescent light, and a second region configured to reflect the fluorescent light and the diffused excitation light which the anisotropic diffusion and reflection unit has diffused and reflected, the first region comprising a plurality of parts arranged in a checkerboard pattern disposed at the center of the mirror; and the diffused excitation light from the anisotropic diffusion and reflection unit is incident so as to avoid the first region.

11. The light source device according to claim 10, wherein the anisotropic diffusion and reflection unit is formed using a reflection surface of a diffraction grating having a predetermined depth and a predetermined pitch.

12. The light source device according to claim 11, wherein the anisotropic diffusion and reflection unit is formed by bonding a diffusing plate on the reflection surface of the diffraction grating, or applying a diffusion material to the reflection surface, or providing fine irregularities on the reflection surface itself.

* * * * *